(12) United States Patent
Campbell et al.

(10) Patent No.: US 10,244,458 B2
(45) Date of Patent: Mar. 26, 2019

(54) CONTROLLING WI-FI ACCESS IN A PUBLIC LOCATION

(71) Applicant: Lenovo Enterprise Solutions (Singapore) Pte. Ltd., Singapore (SG)

(72) Inventors: Keith M. Campbell, Cary, NC (US); William M. Megarity, Raleigh, NC (US); Luke D. Remis, Raleigh, NC (US); Gregory D. Sellman, Morrisville, NC (US)

(73) Assignee: Lenovo Enterprise Solutions (Singapore) Pte. Ltd., Singapore (SG)

(*) Notice: Subject to any disclaimer, the term of this patent is extended or adjusted under 35 U.S.C. 154(b) by 607 days.

(21) Appl. No.: 13/974,818

(22) Filed: Aug. 23, 2013

(65) Prior Publication Data

US 2015/0055455 A1    Feb. 26, 2015

(51) Int. Cl.
*H04W 48/06* (2009.01)
*H04W 84/12* (2009.01)

(52) U.S. Cl.
CPC ............ *H04W 48/06* (2013.01); *H04W 84/12* (2013.01)

(58) Field of Classification Search
CPC ..... H04W 48/00; H04W 48/02; H04W 48/06; H04W 48/12; H04L 63/10
See application file for complete search history.

(56) References Cited

U.S. PATENT DOCUMENTS 8,856,878 B2 * 10/2014 Wohlert ................ H04L 63/101
726/3
9,225,790 B2 * 12/2015 Martini .................... H04L 41/50

2003/0036936 A1    2/2003  Steichen et al.
2005/0255893 A1 * 11/2005  Jin ..................... H04W 52/0229
455/572
2007/0050083 A1    3/2007  Signorelli et al.
(Continued)

FOREIGN PATENT DOCUMENTS

JP            2011221975 A        11/2011

OTHER PUBLICATIONS

Wireless Wizards, Network World Fusion; Control your Guests' Wi-Fi bandwidth; Oct. 7, 2010; TechWorld; pp. 1-4.*

(Continued)

*Primary Examiner* — Uzma Alam
(74) *Attorney, Agent, or Firm* — Law Office of Jim Boice

(57) ABSTRACT

A method, computer system, and/or computer program product controls access to a wireless local area network (WLAN) access point in a retail establishment. A predetermined retail activity threshold is established for a retail establishment, where the retail establishment has a patron service area with a WLAN access point, and where a determination has been made that exceeding the predetermined retail activity threshold without increasing patron traffic out of the retail establishment will cause an excessive wait time for occupying the patron service area. In response to determining that the predetermined retail activity threshold is being exceeded, a secondary criterion is examined in order to determine if the mobile device should be disconnected from the WLAN access point, in order to motivate a user of the mobile device to leave the patron service area. If so, then the mobile device is disconnected from the WLAN access point.

17 Claims, 4 Drawing Sheets

(56) References Cited

U.S. PATENT DOCUMENTS

| | | | |
|---|---|---|---|
| 2008/0141348 A1* | 6/2008 | Hovnanian | H04L 63/104 726/4 |
| 2008/0301446 A1* | 12/2008 | Yonge, III | H04L 12/2801 713/171 |
| 2009/0037269 A1* | 2/2009 | Bassemir | G06Q 30/02 705/14.39 |
| 2009/0077620 A1* | 3/2009 | Ravi | H04L 63/102 726/1 |
| 2011/0187664 A1 | 8/2011 | Rinehart | |
| 2012/0191522 A1 | 7/2012 | McLaughlin et al. | |
| 2013/0151356 A1 | 5/2013 | Kwong | |
| 2013/0143535 A1* | 6/2013 | Leppanen | H04W 4/08 455/414.1 |

OTHER PUBLICATIONS

Guynn, Jessica; Coffee Shops are Taking Wi-Fi off the Menu; Aug. 8, 2010; Los Angeles Times; pp. 1-3.*

Finz, Stacy; Coffee shops limit perks to move Wi-Fi squatters; Aug. 12, 2013; SFGATE, pp. 1-3.*

J. Brown, "Panera Bread Restaurants: The Unspoken Rules of Using Panera Bread Free WiFi", Yahoo! Contributor Network, voices.yahoo.com, Dec. 15, 2008, pp. 1-2.

J. Bullington, "Coffee Shops Take Different Approaches With Laptop Squatters", Chicago Tribune, articles.chicagotribune.com, Mar. 5, 2012, pp. 1-3.

* cited by examiner

CONTROLLING WI-FI ACCESS IN A PUBLIC LOCATION

BACKGROUND

The present disclosure relates to the field of computers, and specifically to computers that access the Internet via a public Wi-Fi hotspot. Still more particularly, the present disclosure relates to selectively allowing access to public Wi-Fi hotspots.

While early computers accessed networks, such as the Internet, via hardwired connections, today most computing devices (including laptop computers, tablet computers, smart phones, etc.) are able to access the Internet via public Wi-Fi hotspots. Wi-Fi is a wireless local area network (WLAN) that comports with the Institute of Electrical and Electronics Engineers (IEEE) 802.11x standards. Accessing this WLAN allows a user to ultimately access the Internet via access provided by an Internet service provider (ISP) that is logically coupled to the Wi-Fi's modem (thus creating the WLAN).

SUMMARY

A method, computer system, and/or computer program product controls access to a wireless local area network (WLAN) access point in a retail establishment. A predetermined retail activity threshold is established for a retail establishment, where the retail establishment has a patron service area with a WLAN access point, and where a determination has been made that exceeding the predetermined retail activity threshold without increasing patron traffic out of the retail establishment will cause an excessive wait time for occupying the patron service area. In response to determining that the predetermined retail activity threshold is being exceeded, a secondary criterion is examined in order to determine if the mobile device should be disconnected from the WLAN access point, in order to motivate a user of the mobile device to leave the patron service area. If so, then the mobile device is disconnected from the WLAN access point.

DETAILED DESCRIPTION

Figure 1:
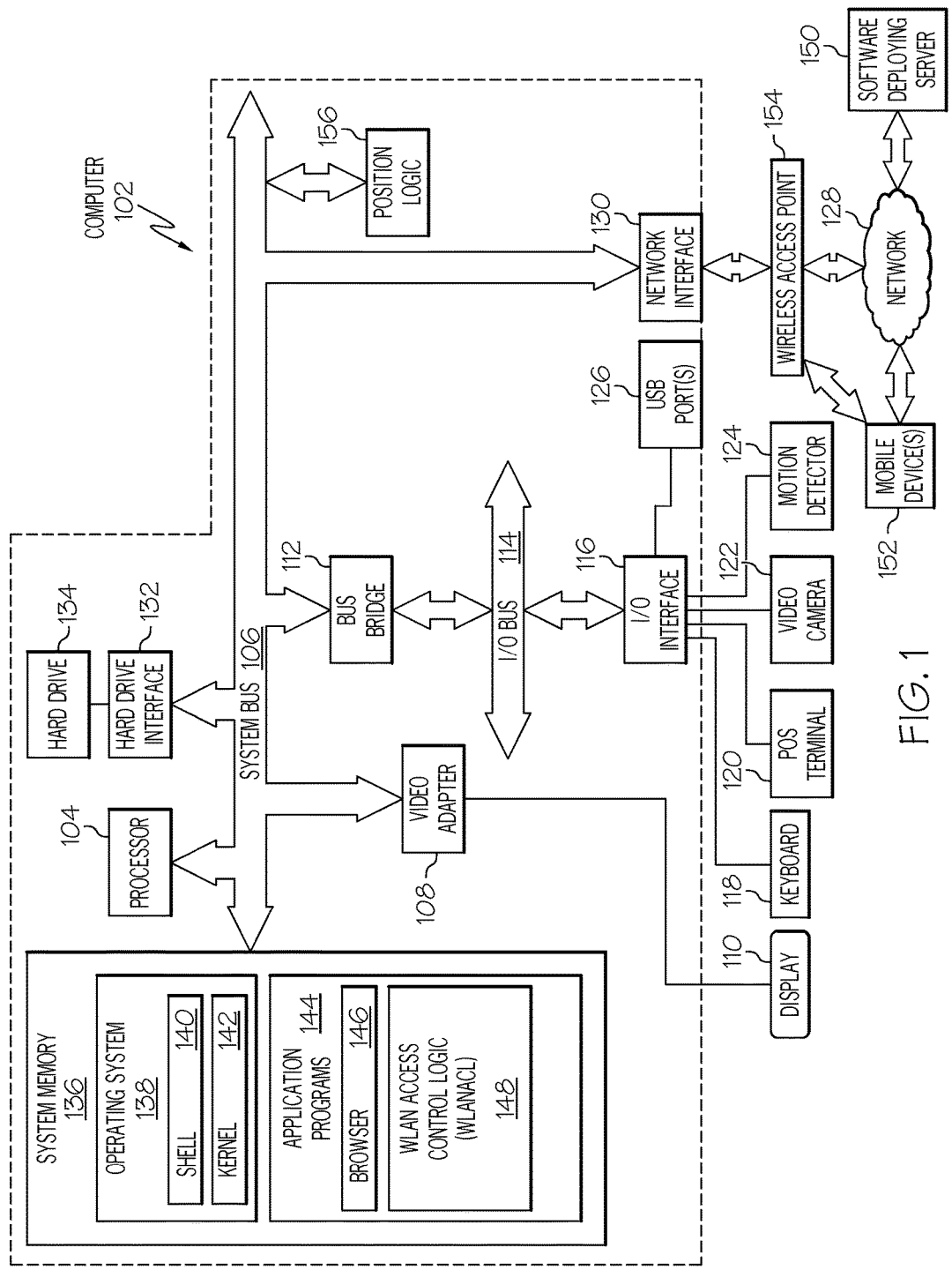
FIG. 1 depicts an exemplary system and network which may be used to implement the present invention.

As will be appreciated by one skilled in the art, aspects of the present invention may be embodied as a system, method or computer program product. Accordingly, aspects of the present invention may take the form of an entirely hardware embodiment, an entirely software embodiment (including firmware, resident software, micro-code, etc.) or an embodiment combining software and hardware aspects that may all generally be referred to herein as a "circuit," "module" or "system." Furthermore, aspects of the present invention may take the form of a computer program product embodied in one or more computer readable medium(s) having computer readable program code embodied thereon.

Any combination of one or more computer readable medium(s) may be utilized. The computer readable medium may be a computer readable signal medium or a computer readable storage medium. A computer readable storage medium may be, for example, but not limited to, an electronic, magnetic, optical, electromagnetic, infrared, or semiconductor system, apparatus, or device, or any suitable combination of the foregoing. More specific examples (a non-exhaustive list) of the computer readable storage medium would include the following: an electrical connection having one or more wires, a portable computer diskette, a hard disk, a random access memory (RAM), a read-only memory (ROM), an erasable programmable read-only memory (EPROM or Flash memory), an optical fiber, a portable compact disc read-only memory (CD-ROM), an optical storage device, a magnetic storage device, or any suitable combination of the foregoing. In the context of this document, a computer readable storage medium may be any tangible medium that can contain, or store a program for use by or in connection with an instruction execution system, apparatus, or device.

A computer readable signal medium may include a propagated data signal with computer readable program code embodied therein, for example, in baseband or as part of a carrier wave. Such a propagated signal may take any of a variety of forms, including, but not limited to, electromagnetic, optical, or any suitable combination thereof. A computer readable signal medium may be any computer readable medium that is not a computer readable storage medium and that can communicate, propagate, or transport a program for use by or in connection with an instruction execution system, apparatus, or device.

Program code embodied on a computer readable medium may be transmitted using any appropriate medium, including, but not limited to, wireless, wireline, optical fiber cable, RF, etc., or any suitable combination of the foregoing.

Computer program code for carrying out operations for aspects of the present invention may be written in any combination of one or more programming languages, including an object oriented programming language such as Java, Smalltalk, C++ or the like and conventional procedural programming languages, such as the "C" programming language or similar programming languages. The program code may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider).

Aspects of the present invention are described below with reference to flowchart illustrations and/or block diagrams of methods, apparatus (systems) and computer program products according to embodiments of the invention. It will be understood that each block of the flowchart illustrations and/or block diagrams, and combinations of blocks in the flowchart illustrations and/or block diagrams, can be implemented by computer program instructions. These computer program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks.

These computer program instructions may also be stored in a computer readable medium that can direct a computer, other programmable data processing apparatus, or other devices to function in a particular manner, such that the instructions stored in the computer readable medium produce an article of manufacture including instructions which implement the function/act specified in the flowchart and/or block diagram block or blocks.

The computer program instructions may also be loaded onto a computer, other programmable data processing apparatus, or other devices to cause a series of operational steps to be performed on the computer, other programmable apparatus or other devices to produce a computer implemented process such that the instructions which execute on the computer or other programmable apparatus provide processes for implementing the functions/acts specified in the flowchart and/or block diagram block or blocks.

With reference now to the figures, and in particular to FIG. 1, there is depicted a block diagram of an exemplary system and network that may be utilized by and/or in the implementation of the present invention. Note that some or all of the exemplary architecture, including both depicted hardware and software, shown for and within computer 102 may be utilized by software deploying server 150 and/or mobile device(s) 152. Note that in one embodiment, mobile device(s) 152 are mobile devices with the ability to connect to the Internet. Examples of such mobile devices include, but are not limited to, "smart" phones, personal digital assistants (PDAs), laptop computers, tablet computers, etc.

Exemplary computer 102 includes a processor 104 that is coupled to a system bus 106. Processor 104 may utilize one or more processors, each of which has one or more processor cores. A video adapter 108, which drives/supports a display 110, is also coupled to system bus 106. System bus 106 is coupled via a bus bridge 112 to an input/output (I/O) bus 114. An I/O interface 116 is coupled to I/O bus 114. I/O interface 116 affords communication with various I/O devices, including a keyboard 118, a point of sale (POS) terminal 120, a video camera 122, a motion detector 124, and external USB port(s) 126. While the format of the ports connected to I/O interface 116 may be any known to those skilled in the art of computer architecture, in one embodiment some or all of these ports are universal serial bus (USB) ports.

As depicted, computer 102 is able to communicate with a software deploying server 150 and/or mobile device(s) 152 using a network interface 130 that accesses a network 128. Network interface 130 is a hardware network interface, such as a network interface card (NIC), etc. Network 128 may be an external network such as the Internet, or an internal network such as an Ethernet or a virtual private network (VPN). In one embodiment, access to the network 128 is via a wireless access point 154, which is a wireless modem that allows devices that are compliant with a wireless protocol (e.g., IEEE 802.11x—"Wi-Fi") to wirelessly access network 128. Note that wireless access point 154 affords mobile device(s) 152 access to network 128 (e.g., the Internet), and also affords computer 102 direct access to the mobile device(s) 152.

Other examples of the wireless network depicted by network 128 include, but are not limited to, a near field communication (NFC) network (in which devices communicate at ranges of 4 cm or less); personal area networks (PANs), such as those that use industrial, scientific, and medical (ISM) radio bands and protocols defined in the Institute of Electrical and Electronics Engineers (IEEE) 802.15.1 standard for wireless communications within a few meters; as well as a wireless local area network (WLAN), such as a Wi-Fi network, which enables wireless communication in a range of approximately 100 meters in accordance with the IEEE 802.11x standards.

A hard drive interface 132 is also coupled to system bus 106. Hard drive interface 132 interfaces with a hard drive 134. In one embodiment, hard drive 134 populates a system memory 136, which is also coupled to system bus 106. System memory is defined as a lowest level of volatile memory in computer 102. This volatile memory includes additional higher levels of volatile memory (not shown), including, but not limited to, cache memory, registers and buffers. Data that populates system memory 136 includes computer 102's operating system (OS) 138 and application programs 144.

OS 138 includes a shell 140, for providing transparent user access to resources such as application programs 144. Generally, shell 140 is a program that provides an interpreter and an interface between the user and the operating system. More specifically, shell 140 executes commands that are entered into a command line user interface or from a file. Thus, shell 140, also called a command processor, is generally the highest level of the operating system software hierarchy and serves as a command interpreter. The shell provides a system prompt, interprets commands entered by keyboard, mouse, or other user input media, and sends the interpreted command(s) to the appropriate lower levels of the operating system (e.g., a kernel 142) for processing. Note that while shell 140 is a text-based, line-oriented user interface, the present invention will equally well support other user interface modes, such as graphical, voice, gestural, etc.

As depicted, OS 138 also includes kernel 142, which includes lower levels of functionality for OS 138, including providing essential services required by other parts of OS 138 and application programs 144, including memory management, process and task management, disk management, and mouse and keyboard management.

Application programs 144 include a renderer, shown in exemplary manner as a browser 146. Browser 146 includes program modules and instructions enabling a world wide web (WWW) client (i.e., computer 102) to send and receive network messages to the Internet using hypertext transfer protocol (HTTP) messaging, thus enabling communication with software deploying server 150 and other computer systems such as mobile device(s) 152.

Application programs 144 in computer 102's system memory (as well as software deploying server 150's system memory) also include a wireless local area network access control logic (WLANACL) 148. WLANACL 148 includes code for implementing the processes described below, including those described and/or referenced in FIGS. 2-4. In one embodiment, computer 102 is able to download WLANACL 148 from software deploying server 150, including in an on-demand basis, wherein the code in WLANACL 148 is not downloaded until needed for execution. Note further that, in one embodiment of the present invention, software deploying server 150 performs all of the functions associated with the present invention (including execution of WLANACL 148), thus freeing computer 102 from having to use its own internal computing resources to execute WLANACL 148.

In one embodiment, also within computer 102 (and more specifically, within mobile device(s) 152) is a position logic 156. Position logic 156 is hardware logic that is able to determine the physical location of computer 102 in real time. For example, position logic 156 may be a global positioning system (GPS) receiver, a local triangulation system (e.g., that receives wireless signals from local transmitters, and triangulates these signals to establish a fine-grained location of a device), or any other positioning system known to those skilled in the art for determining a current location of a device.

Note that the hardware elements depicted in computer 102 are not intended to be exhaustive, but rather are representative to highlight essential components required by the present invention. For instance, computer 102 may include alternate memory storage devices such as magnetic cassettes, digital versatile disks (DVDs), Bernoulli cartridges, and the like. These and other variations are intended to be within the spirit and scope of the present invention.

Figure 2:
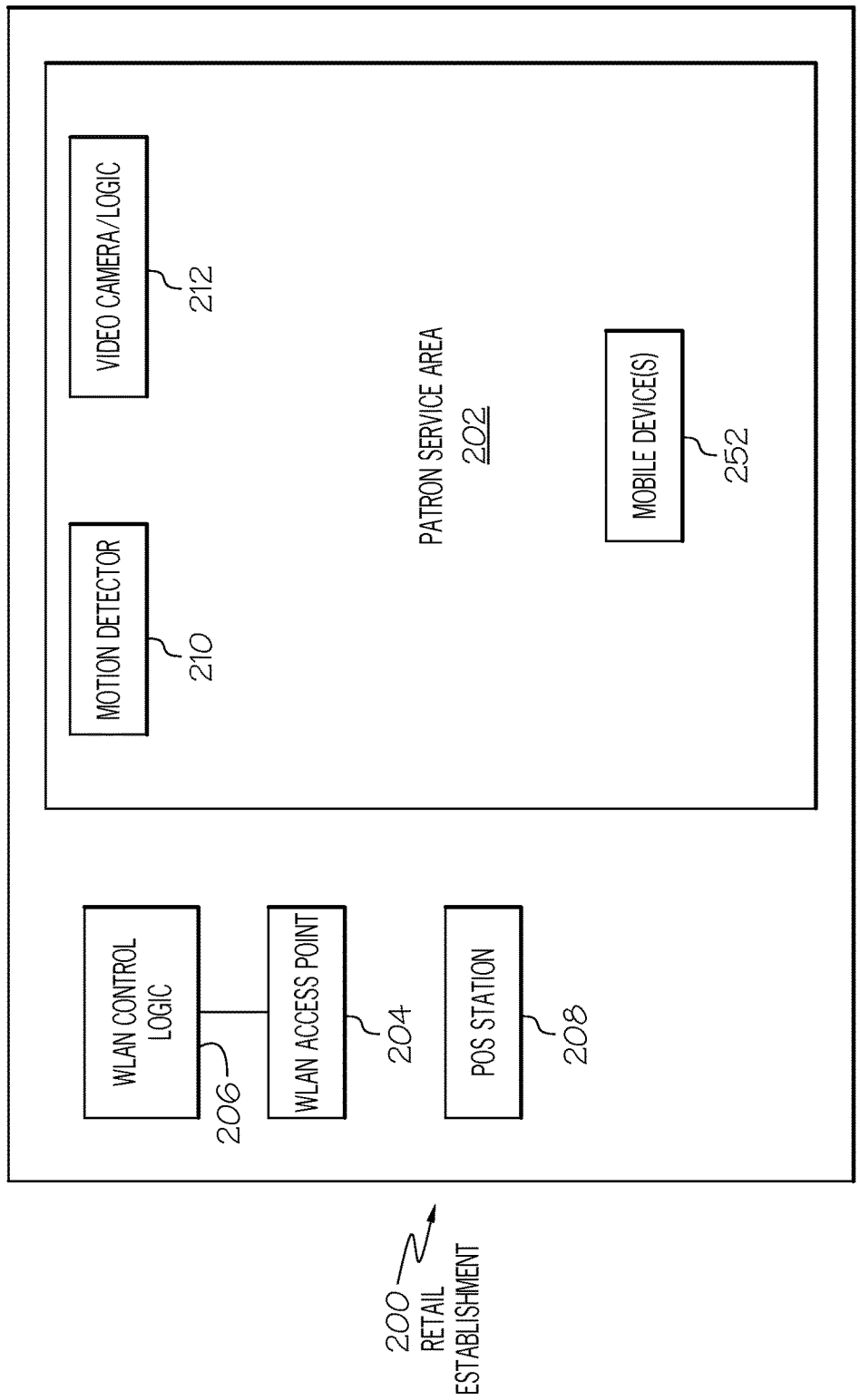
FIG. 2 depicts an retail establishment in which the present invention may be utilized.

With reference now to FIG. 2, an exemplary retail establishment 200 in which the present invention may be utilized is presented. As depicted, with the retail establishment 200 is a patron service area 202, which may include tables, chairs, etc. at which patrons are seated while receiving the goods and/or services provided by the retail establishment 200. For example, if retail establishment 200 is a restaurant, coffee bar, etc., then patron service area 202 would be that area where patrons are provided service. Thus, in this example patron service area 202 is the area where table seating, bar seating, standup service, etc. is provided.

As depicted, the retail establishment 200 provides Wi-Fi services to its customers (either at no charge or for a fee) via a wireless local area network (WLAN) access point 204, which is a wireless modem (e.g., a Wi-Fi transceiver such as wireless access point 154 depicted in FIG. 1). WLAN access point 204 provides patrons with mobile device(s) 252 (e.g., mobile device(s) 152 depicted in FIG. 1) access to a network such as the Internet (e.g., network 128 shown in FIG. 1). Access to the WLAN access point 204, and thus the Internet (not depicted in FIG. 2), is controlled by a wireless local area network (WLAN) control logic 206. An exemplary WLAN control logic 206 is computer 102 (depicted in FIG. 1) running WLANACL 148. Thus, WLAN control logic 206 is able to selectively connect and disconnect the mobile device(s) 252 to the Internet via the WLAN access point 204.

As described herein, various criteria are used by the WLAN control logic 206 to determine which of the mobile device(s) 252 are allowed to connect to the WLAN access point 204. A "trigger" criterion is based on retail activity levels (i.e., how "busy" the store is). As described herein, if the store is too "busy", then one or more secondary criteria will be used to selectively evict one or more of the mobile device(s) 252 from the WLAN provided by the WLAN access point 204, thus encouraging users of the evicted mobile devices to leave the store (retail establishment 200).

In order to determine how "busy" the retail establishment 200 is, various approaches can be used. For example, assume that the retail establishment is a restaurant or coffee bar where patrons order and/or pay for their food/coffee/drinks as soon as they enter the retail establishment 200. WLAN control logic 206 monitors these transactions and, using logic such as algorithms found in WLANACL 148, determines whether a predetermined retail activity threshold has been exceeded (i.e., is too "busy"). If this predetermined retail activity threshold has been exceeded, then the WLANACL 148 determines that seating/service capacity within patron service area 202 has been exceeded, and thus new patrons are having to wait for a seat/service. This condition triggers the examination of one or more secondary criteria to determine if access to the WLAN access point 204 needs to be selectively adjusted.

In one embodiment, a determination is made that the predetermined retail activity threshold has been exceeded based on sensor output from a motion detector 210 and/or a video camera/logic 212 aimed at the patron service area 202 and/or other parts of the retail establishment 200 (e.g., a waiting area inside or outside of the retail establishment 200). The motion detector 210 is able to quantify how much movement is occurring within its monitored area. Logic within WLAN control logic 206 converts these raw data figures into ranges of activity levels (e.g., "slow", "busy", "overcrowded"). If the level of activity is "overcrowded", then this condition triggers the examination of one or more secondary criteria to determine if access to the WLAN access point 204 needs to be selectively adjusted.

Similarly, a video camera/logic 212 includes a video camera and logic that is able to recognize how many persons are within the patron service area 202 and/or other areas within and outside of the retail establishment 200. Video camera/logic 212 takes video signals that recognize human shapes and/or their movement, converts these video signals into ranges of activity levels (e.g., "slow", "busy", "overcrowded"). If the level of activity is "overcrowded", then this condition triggers the examination of one or more secondary criteria to determine if access to the WLAN access point 204 needs to be selectively adjusted.

Figure 3:
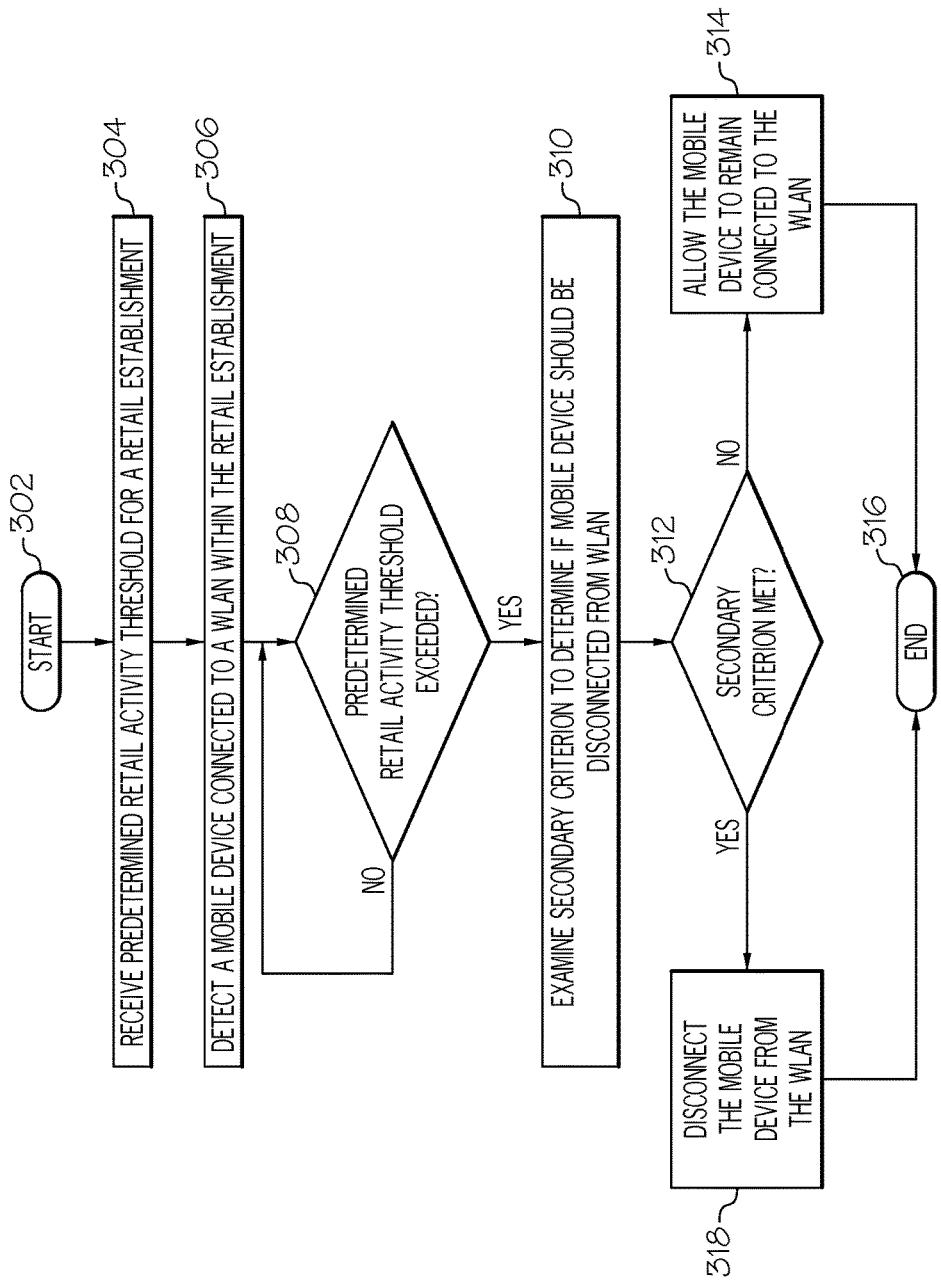
FIG. 3 is a high level flow chart of one or more exemplary steps taken by one or more processors to control access to a public wireless local area network access point in a retail establishment.

With reference now to FIG. 3, a high level flow chart of one or more exemplary steps taken by one or more processors to control access to a public wireless local area network access point in a retail establishment is presented. After initiator block 302, a predetermined retail activity threshold for a retail establishment is received (block 304). As described herein, the retail establishment (e.g., retail establishment 200 shown in FIG. 2) has a patron service area (e.g., patron service area 200) with a public wireless local area network access point (e.g., WLAN access point 204). A determination has been made that exceeding the predetermined retail activity threshold without increasing patron traffic out of the retail establishment will cause a predefined wait time to occupy the patron service area to be exceeded. This determination may be made by executing routines within WLANACL 148 shown in FIG. 1. That is, based on known factors such as 1) the size of patron service area 202 and/or its seating capacity, 2) historical data of average lengths of time that patrons (with or without mobile devices that are using the retail establishment's "hot spot" access to the Internet) occupy the patron service area 202, and/or 3) real time data describing how "busy" the retail establishment is currently, a determination is made that patrons are currently (or will soon be) waiting for a table to open up within the patron service area 202.

As depicted in block 306, a wireless local area network access point management computer (e.g., WLAN control logic 206 depicted in FIG. 2) detects a first mobile device wirelessly connected to the public wireless local area network access point. The wireless local area network access point management computer also determines whether the predetermined retail activity threshold is being exceeded in real time (query block 308). In one embodiment, this determination is made automatically by the WLAN control logic 206 depicted in FIG. 2. In another embodiment, the determination is made by a manager of the retail establishment 200, who simply judges that the store is being overcrowded. In this other embodiment, the manager inputs an "overcrowded" signal into the WLAN control logic 206, thus triggering the evaluation of one or more of the secondary criteria described herein for evicting one or more mobile devices from the WLAN.

Thus, as depicted in block 310, in response to determining that the predetermined retail activity threshold is being exceeded in real time, one or more secondary criteria are examined by the WLAN access point management computer (e.g., WLAN control logic 206 depicted in FIG. 2) to determine if a first mobile device should be disconnected from the public wireless local area network access point in order to remove a motivation of a first user of the first mobile device to remain within the patron service area. If the wireless local area network access point management computer has determined that one or more of the secondary criterion has been met (query block 310), then the first mobile device is disconnected from the public wireless local area network access point (and thus the WLAN and/or Internet) in order to motivate the first user of the first mobile device to vacate the patron service area (block 318), and the process ends (terminator block 316). If the secondary criterion is not met, the first mobile device is allowed to remain connected to the public wireless local area network access point and WLAN and/or Internet (block 314).

Figure 4:
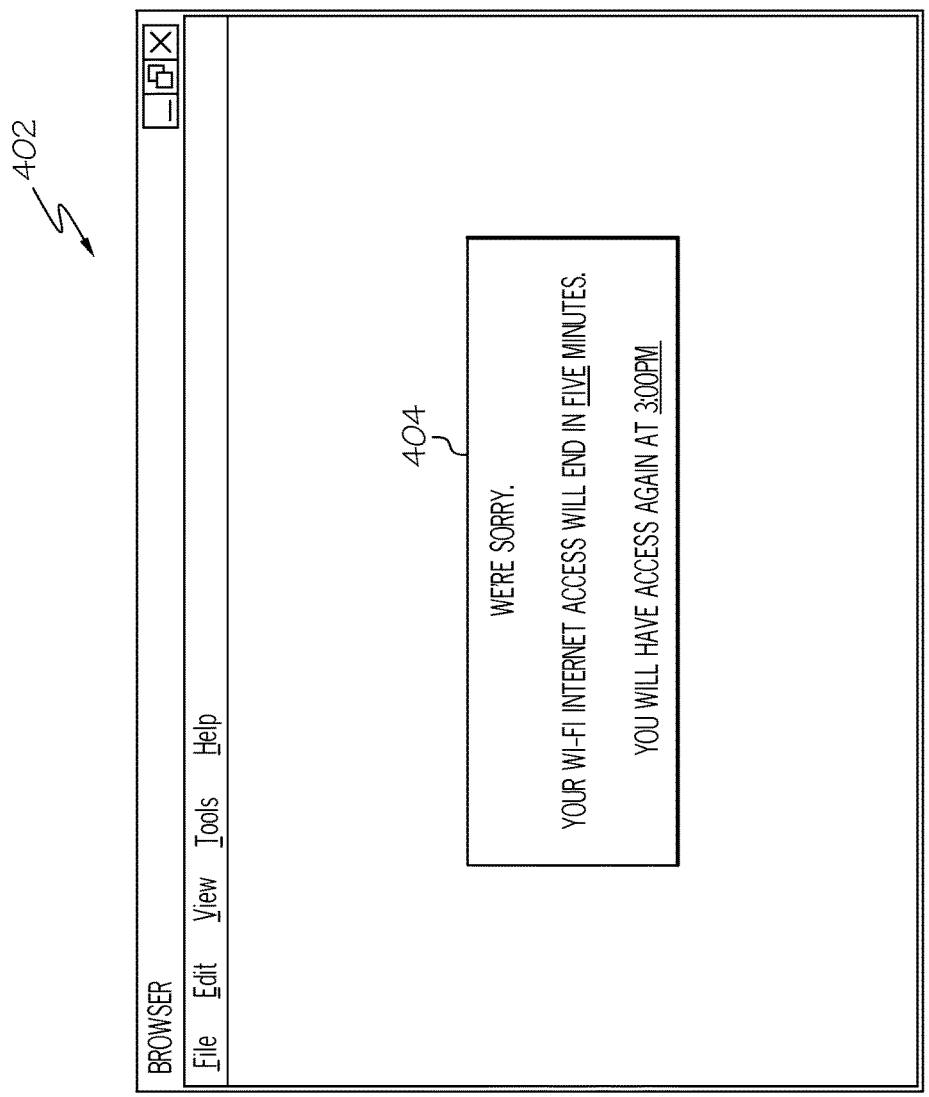
FIG. 4 is an exemplary user interface of a mobile device that is connected to the public wireless local area network access point.

As depicted in FIG. 4, an exemplary user interface 402 of a mobile device that is connected to the public wireless Internet access point is depicted. Various types of information can be presented to the mobile device and its user. In one embodiment, this information includes a warning 404, letting the user know that his/her Internet access will be terminated within a certain period of time. If the WLAN control logic 206 is able to predict when the retail establishment will no longer be overcrowded (e.g., using historical data, etc.), then the user is given a time at which he/she will be allowed to reconnect to the store's hotspot. Otherwise, this reconnection information/suggestion is hidden from the user.

In one embodiment, the secondary criterion used to determine if a particular mobile device is to be removed from the WLAN is the predetermined retail activity threshold being exceeded. That is, whenever the predetermined retail activity threshold is exceeded, then at least one of the mobile devices in the patron service area 202 is disconnected from the WLAN.

In one embodiment, the secondary criterion used to determine if a particular mobile device is to be removed from the WLAN relates to a relative amount of money being spent by the first user of the first mobile device compared to other users of other mobile devices within the patron service area. In this embodiment, a comparison is made between a first amount of money spent by the first user of the first mobile device to a second amount of money spent by a second user of a second mobile device at the retail establishment within a predefined period of time. In response to the second amount of money spent by the second user exceeding the first amount of money spent by the first user of a first mobile device at the retail establishment within the predefined period of time, the WLAN control logic disconnects the first mobile device from the public wireless local area network access point and allows the second mobile device to access the public wireless local area network access point. For example, assume that User A spent $10.00 on food/beverages, while User B spent only $1.00 on food beverages at the retail establishment. User A is thus given priority to access the WLAN over User B when the retail establishment is overcrowded. Note that it is not the fact that User A reached some threshold spending amount (e.g., at least $10.00), but rather that User A spent more than ($10.00>$1.00) User B.

In one embodiment, the secondary criterion used to determine if a particular mobile device is to be removed from the WLAN relates to a type of mobile device being used to connect to the public wireless local area network access point. In this example, the types of mobile devices being used to connect to the public wireless local area network access point are identified as being favored or disfavored, wherein a favored type of mobile device has been predetermined to have precedence over a disfavored type of mobile device for connecting to the public wireless local area network access point. In response to the first mobile device being identified as the disfavored type of mobile device, the first mobile device is disconnected from the public wireless local area network access point and a second mobile device (which is identified as the favored type of mobile device) is allowed to access (e.g., to continue to access or to initially access) the public wireless local area network access point. For example, assume that User A is using a Type A mobile device and User B is using a Type B mobile device. The type may depend on 1) who manufactured the device (e.g., Company A made Type A mobile device and Company B made Type B mobile device); and/or 2) the architecture of the device (e.g., Type A mobile devices are laptop computers and Type B mobile devices are smart phones). Thus, a particular retail outlet may give preferential treatment to devices that are made by a certain company (e.g., due to a relationship between the retail establishment and the manufacturer of the mobile device). With regards to the architecture, if a user is using a laptop computer, then an assumption can be made that he/she will be using more bandwidth on the WLAN and/or will be in the Internet longer than a smart phone, and thus the smart phone is allowed to stay on the WLAN while the laptop is evicted.

In one embodiment, the secondary criterion used to determine if a particular mobile device is to be removed from the WLAN relates to a type of webpage currently being accessed by the first mobile device. Thus, an identification of a webpage currently being accessed by the first mobile device is made by the WLAN control logic 206. In response to determining that the webpage currently being accessed by the first mobile device belongs to the retail establishment, the first mobile device is allowed to remain connected to the public wireless local area network access point for as long as the first mobile device continues to access the webpage that belongs to the retail establishment. For example, assume that retail establishment is owned by Company X. In one embodiment, as long as the user is logged onto and/or interacting with (e.g., clicking buttons, making purchases, etc.) a website that belongs to Company X, that user will be allowed to remain connected to the retail establishment's WLAN, regardless of how busy the retail establishment is, how much the user spent in the retail establishment, or any other criteria.

In one embodiment, the secondary criterion used to determine if a particular mobile device is to be removed from the WLAN relates to a birthday of a user of the first mobile device. In this embodiment, the WLAN control logic determines whether or not real time (during which the mobile device is being monitored) is during the birthday of the user of the first mobile device. In response to determining that the real time is during the birthday of the user of the first mobile device, the WLAN control logic keeps the first mobile device connected to the public wireless local area network access point and disconnects a second mobile device from the public wireless local area network access point. For example, assume that today is the birthday of User A of Device A. User A is therefore allowed to remain connected to the WLAN, while User B (whose birthday is not today) is evicted from the WLAN.

In one embodiment, the secondary criterion used to determine if a particular mobile device is to be removed from the WLAN secondary criterion relates to a loyalty card program for the retail establishment. Thus, a determination is made (e.g., by WLAN control logic 206) that a user of the first mobile device is a member of the loyalty card program for the retail establishment. An exemplary loyalty card is a membership card that gives an enrolled member enhanced benefits, including discounts and other privileges. In response to determining that the user of the first mobile device is a member of the loyalty card program for the retail establishment, the first mobile device is kept connected (e.g., by WLAN control logic 206) to the public wireless local area network access point and a second mobile device is disconnected from the public wireless local area network access point. Note that it is not just a static condition of User A being a loyalty card holder that keeps User A's mobile device connected to the WLAN, but rather a combination of User A being a loyalty card holder and User B not being a loyalty card holder that allows User A to remain connected to the WLAN while User B is evicted from the WLAN.

In one embodiment, the secondary criterion used to determine if a particular mobile device is to be removed from the WLAN relates to bandwidth usage on the public wireless local area network access point. In one embodiment, a determination is made that the first mobile device is using more than a predefined amount of bandwidth (or, in one embodiment, more than a second mobile device) on the public wireless local area network access point; and in response to determining that the first mobile device is using more than the predefined amount (or more than the second mobile device) of bandwidth on the public wireless local area network access point, disconnecting the first mobile device from the public wireless local area network access point. In another embodiment, however, a determination is made that the first mobile device is using less than a predefined amount of bandwidth (or, in one embodiment, less than a second mobile device) on the public wireless local area network access point; and in response to determining that the first mobile device is using less than the predefined amount of bandwidth (or less than the second mobile device) on the public wireless local area network access point, the first mobile device is disconnected from the public wireless local area network access point. That is, in the first embodiment (in which a device is using an excessive amount of bandwidth), as assumption is made that the user is using too much bandwidth, and thus slows down other users (making them take up a table longer). Thus, this "bandwidth hog" is evicted, such that other users can finish their work and free up their table. In the second embodiment, however, using too little bandwidth is indicative of a user who is "camping", and is staying connected to the Internet for long periods of time waiting for e-mails, keeping access open to research questions that arise over a period of time, etc. That is, light bandwidth usage, particularly over some predefined period of time, indicates that the user is using the retail establishment as a long-term work and/or study facility.

The flowchart and block diagrams in the figures illustrate the architecture, functionality, and operation of possible implementations of systems, methods and computer program products according to various embodiments of the present disclosure. In this regard, each block in the flowchart or block diagrams may represent a module, segment, or portion of code, which comprises one or more executable instructions for implementing the specified logical function (s). It should also be noted that, in some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts, or combinations of special purpose hardware and computer instructions.

The terminology used herein is for the purpose of describing particular embodiments only and is not intended to be limiting of the invention. As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof.

The corresponding structures, materials, acts, and equivalents of all means or step plus function elements in the claims below are intended to include any structure, material, or act for performing the function in combination with other claimed elements as specifically claimed. The description of various embodiments of the present invention has been presented for purposes of illustration and description, but is not intended to be exhaustive or limited to the invention in the form disclosed. Many modifications and variations will be apparent to those of ordinary skill in the art without departing from the scope and spirit of the invention. The embodiment was chosen and described in order to best explain the principles of the invention and the practical application, and to enable others of ordinary skill in the art to understand the invention for various embodiments with various modifications as are suited to the particular use contemplated.

Note further that any methods described in the present disclosure may be implemented through the use of a VHDL (VHSIC Hardware Description Language) program and a VHDL chip. VHDL is an exemplary design-entry language for Field Programmable Gate Arrays (FPGAs), Application Specific Integrated Circuits (ASICs), and other similar electronic devices. Thus, any software-implemented method described herein may be emulated by a hardware-based VHDL program, which is then applied to a VHDL chip, such as a FPGA.

Having thus described embodiments of the invention of the present application in detail and by reference to illustrative embodiments thereof, it will be apparent that modifications and variations are possible without departing from the scope of the invention defined in the appended claims.

What is claimed is:

1. A method of controlling access to a public wireless local area network access point in a retail establishment, the method comprising:

detecting, by a motion sensor, a level of patron movement within the retail establishment;

determining, by one or more processors, that a predetermined retail activity threshold is currently being exceeded based on the level of patron movement within the retail establishment as detected by the motion sensor, wherein the retail establishment has a patron service area with a public wireless local area network access point, and wherein a determination has been made that exceeding the predetermined retail activity threshold without increasing patron traffic out of the retail establishment will cause a predefined wait time to occupy the patron service area to be exceeded;

detecting, by a wireless local area network access point management computer, a first mobile device wirelessly connected to the public wireless local area network access point;

determining, by one or more processors, that the predetermined retail activity threshold is being exceeded in real time;

in response to determining that the predetermined retail activity threshold is being exceeded in real time, examining, by the wireless local area network access point management computer, a secondary criterion to determine if the first mobile device should be disconnected from the public wireless local area network access point in order to remove a motivation of a first user of the first mobile device to remain within the patron service area, wherein the secondary criterion relates to bandwidth usage on the public wireless local area network access point, and wherein the secondary criterion further relates to a loyalty card program for the retail establishment;

determining, by the wireless local area network access point management computer, that the first mobile device is using more bandwidth on the public wireless local area network access point than a second mobile device at the retail establishment during a predefined period of time;

in response to determining that the first mobile device is using more bandwidth on the public wireless local area network access point than the second mobile device at the retail establishment during the predefined period of time, disconnecting, by the wireless local area network access point management computer, the first mobile device from the public wireless local area network access point;

determining, by the wireless local area network access point management computer, that the first user of the first mobile device is a member of the loyalty card program for the retail establishment;

in response to determining that the first user of the first mobile device is a member of the loyalty card program for the retail establishment, reconnecting, by the wireless local area network access point management computer, the first mobile device to the public wireless local area network access point and disconnecting the second mobile device from the public wireless local area network access point; and in response to determining that the predetermined retail activity threshold is currently being exceeded based on the level of patron movement within the retail establishment as detected by the motion sensor, disconnecting, by the wireless local area network access point management computer, the first mobile device from the public wireless local area network access point.

2. The method of claim 1, wherein the secondary criterion is the predetermined retail activity threshold being exceeded.

3. The method of claim 1, wherein the secondary criterion relates to a relative amount of money being spent by the first user of the first mobile device compared to other users of other mobile devices within the patron service area, and wherein the method further comprises:

comparing a first amount of money spent by the first user of the first mobile device to a second amount of money spent by a second user of a second mobile device at the retail establishment within a predefined period of time; and in response to the second amount of money spent by the second user exceeding the first amount of money spent by the first user of the first mobile device at the retail establishment within the predefined period of time, disconnecting the first mobile device from the public wireless local area network access point and allowing the second mobile device to access the public wireless local area network access point.

4. The method of claim 1, wherein the secondary criterion relates to a type of mobile device being used to connect to the public wireless local area network access point, and wherein the method further comprises:

identifying types of mobile devices being used to connect to the public wireless local area network access point as being favored or disfavored, wherein a favored type of mobile device has been predetermined to have precedence over a disfavored type of mobile device for connecting to the public wireless local area network access point; and in response to the first mobile device being identified as the disfavored type of mobile device, disconnecting the first mobile device from the public wireless local area network access point and allowing a second mobile device to access the public wireless local area network access point, wherein the second mobile device is identified as the favored type of mobile device.

5. The method of claim 4, wherein the type of mobile device describes a brand name of the mobile device.

6. The method of claim 5, wherein the type of mobile device describes an architecture of the mobile device.

7. The method of claim 1, wherein the secondary criterion relates to a type of webpage currently being accessed by the first mobile device, and wherein the method further comprises:

identifying a webpage currently being accessed by the first mobile device;

in response to determining that the webpage currently being accessed by the first mobile device belongs to the retail establishment, keeping the first mobile device connected to the public wireless local area network access point for as long as the first mobile device continues to access the webpage that belongs to the retail establishment.

8. The method of claim 1, wherein the secondary criterion relates to a birthday of a user of the first mobile device, and wherein the method further comprises:

determining that the real time is during the birthday of the first user of the first mobile device; and in response to determining that the real time is during the birthday of the first user of the first mobile device, keeping the first mobile device connected to the public wireless local area network access point and disconnecting a second mobile device from the public wireless local area network access point.

9. The method of claim 1, further comprising:
predicting, by one or more processors, a time at which the predetermined retail activity threshold will no longer be exceeded; and
transmitting, by one or more processors, a message to the first mobile device identifying the time at which the first mobile device will be permitted to reconnect to the public wireless local area network access point.

10. The method of claim 1, wherein the secondary criterion relates to bandwidth usage on the public wireless local area network access point, and wherein the method further comprises:
determining that the first mobile device is using less than a predefined amount of bandwidth on the public wireless local area network access point; and
in response to determining that the first mobile device is using less than the predefined amount of bandwidth on the public wireless local area network access point, disconnecting the first mobile device from the public wireless local area network access point.

11. A computer program product for controlling access to a public wireless local area network access point in a retail establishment, the computer program product comprising a computer readable storage medium having program code embodied therewith, the program code readable and executable by one or more processors to perform a method comprising:
detecting, by a motion sensor, a level of patron movement within the retail establishment;
determining that the predetermined retail activity threshold is currently being exceeded based on the level of patron movement within the retail establishment as detected by the motion sensor, wherein the retail establishment has a patron service area with a public wireless local area network access point, and wherein a determination has been made that exceeding the predetermined retail activity threshold without increasing patron traffic out of the retail establishment will cause a predefined wait time to occupy the patron service area to be exceeded;
detecting, by a wireless local area network access point management computer, a first mobile device wirelessly connected to the public wireless local area network access point;
determining that the predetermined retail activity threshold is being exceeded in real time;
in response to determining that the predetermined retail activity threshold is being exceeded in real time, examining, by the wireless local area network access point management computer, a secondary criterion to determine if the first mobile device should be disconnected from the public wireless local area network access point in order to remove a motivation of a first user of the first mobile device to remain within the patron service area, wherein the secondary criterion relates to bandwidth usage on the public wireless local area network access point, and wherein the secondary criterion further relates to a loyalty card program for the retail establishment;
determining that the first mobile device is using less bandwidth on the public wireless local area network access point than a second mobile device at the retail establishment during a predefined period of time;
in response to determining that the first mobile device is using less bandwidth on the public wireless local area network access point than the second mobile device at the retail establishment during the predefined period of time, disconnecting the first mobile device from the public wireless local area network access point;
determining that the first user of the first mobile device is a member of the loyalty card program for the retail establishment;
in response to determining that the first user of the first mobile device is a member of the loyalty card program for the retail establishment, reconnecting the first mobile device to the public wireless local area network access point and disconnecting the second mobile device from the public wireless local area network access point;
and
in response to determining that the predetermined retail activity threshold is currently being exceeded based on the level of patron movement within the retail establishment as detected by the motion sensor, disconnecting the first mobile device from the public wireless local area network access point.

12. The computer program product of claim 11, wherein the secondary criterion relates to a relative amount of money being spent by the first user of the first mobile device compared to other users of other mobile devices within the patron service area, and wherein the program code is further readable and executable by one or more processors to perform the method further comprising:
comparing a first amount of money spent by the first user of the first mobile device to a second amount of money spent by a second user of a second mobile device at the retail establishment within a predefined period of time; and
in response to the second amount of money spent by the second user exceeding the first amount of money spent by the first user of a first mobile device at the retail establishment within the predefined period of time, disconnecting the first mobile device from the public wireless local area network access point and allowing the second mobile device to access the public wireless local area network access point.

13. The computer program product of claim 11, wherein the secondary criterion relates to a type of webpage currently being accessed by the first mobile device, and wherein the program code is further readable and executable by one or more processors to perform the method further comprising:
identifying a webpage currently being accessed by the first mobile device;
in response to determining that the webpage currently being accessed by the first mobile device belongs to the retail establishment, keeping the first mobile device connected to the public wireless local area network access point for as long as the first mobile device continues to access the webpage that belongs to the retail establishment.

14. A computer system comprising:
a processor, a computer readable memory, and a computer readable storage medium;
first program instructions to detect, based on readings from a motion sensor, a level of patron movement within the retail establishment;
second program instructions to determine that the predetermined retail activity threshold is currently being exceeded based on the level of patron movement within the retail establishment as detected by the motion sensor, wherein the retail establishment has a patron service area with a public wireless local area network access point, and wherein a determination has been made that exceeding the predetermined retail activity threshold without increasing patron traffic out of the retail establishment will cause a predefined wait time to occupy the patron service area to be exceeded;

third program instructions to detect a first mobile device wirelessly connected to the public wireless local area network access point;

fourth program instructions to determine that the predetermined retail activity threshold is being exceeded in real time;

fifth program instructions to, in response to determining that the predetermined retail activity threshold is being exceeded in real time, examine a secondary criterion to determine if the first mobile device should be disconnected from the public wireless local area network access point in order to remove a motivation of a first user of the first mobile device to remain within the patron service area, wherein the secondary criterion relates to bandwidth usage on the public wireless local area network access point, and wherein the secondary criterion further relates to a loyalty card program for the retail establishment;

sixth program instructions to determine that the first mobile device is using less than a predefined amount of bandwidth on the public wireless local area network access point;

seventh program instructions to, in response to determining that the first mobile device is using less than the predefined amount of bandwidth on the public wireless local area network access point, disconnect the first mobile device from the public wireless local area network access point;

eighth program instructions to determine that the first user of the first mobile device is a member of the loyalty card program for the retail establishment;

ninth program instructions to, in response to determining that the first user of the first mobile device is a member of the loyalty card program for the retail establishment, reconnect the first mobile device to the public wireless local area network access point and disconnecting the second mobile device from the public wireless local area network access point; and tenth program instructions to, in response to determining that the predetermined retail activity threshold is currently being exceeded based on the level of patron movement, disconnect the first mobile device from the public wireless local area network access point; and wherein the first, second, third, fourth, fifth, sixth, seventh, eighth, ninth, and tenth program instructions are stored on the computer readable storage medium for execution by the processor via the computer readable memory.

15. The computer system of claim 14, wherein the secondary criterion relates to a relative amount of money being spent by the first user of the first mobile device compared to other users of other mobile devices within the patron service area, and wherein the computer system further comprises:

eleventh program instructions to compare a first amount of money spent by the first user of the first mobile device to a second amount of money spent by a second user of a second mobile device at the retail establishment within a predefined period of time; and twelfth program instructions to, in response to the second amount of money spent by the second user exceeding the first amount of money spent by the first user of a first mobile device at the retail establishment within the predefined period of time, disconnect the first mobile device from the public wireless local area network access point and allow the second mobile device to access the public wireless local area network access point; and wherein the eleventh and twelfth program instructions are stored on the computer readable storage medium for execution by the processor via the computer readable memory.

16. The computer system of claim 14, wherein the secondary criterion relates to a type of webpage currently being accessed by the first mobile device, and wherein the computer system further comprises:

eleventh program instructions to identify a webpage currently being accessed by the first mobile device; and twelfth program instructions to, in response to determining that the webpage currently being accessed by the first mobile device belongs to the retail establishment, keep the first mobile device connected to the public wireless local area network access point for as long as the first mobile device continues to access the webpage that belongs to the retail establishment; and wherein the eleventh and twelfth program instructions are stored on the computer readable storage medium for execution by the processor via the computer readable memory.

17. The computer system of claim 14, wherein the secondary criterion relates to a birthday of the first user of the first mobile device, and wherein the computer system further comprises:

eleventh program instructions to determine that the real time is during the birthday of the first user of the first mobile device; and twelfth program instructions to, in response to determining that the real time is during the birthday of the first user of the first mobile device, keep the first mobile device connected to the public wireless local area network access point and to disconnect a second mobile device from the public wireless local area network access point; and wherein the eleventh and twelfth program instructions are stored on the computer readable storage medium for execution by the processor via the computer readable memory.

* * * * *